(12) United States Patent
Guillez et al.

(10) Patent No.: US 6,866,323 B2
(45) Date of Patent: Mar. 15, 2005

(54) CONVERTIBLE VEHICLE WITH A RETRACTABLE ROOF

(75) Inventors: Jean-Marc Guillez, Cerizay (FR); Paul Queveau, Cerizay (FR); Gérard Queveau, Cerizay (FR)

(73) Assignee: Societe Europeene de Brevets, Paris (FR)

(*) Notice: Subject to any disclaimer, the term of this patent is extended or adjusted under 35 U.S.C. 154(b) by 0 days.

(21) Appl. No.: 10/485,235

(22) PCT Filed: Jul. 31, 2002

(86) PCT No.: PCT/FR02/02766
§ 371 (c)(1),
(2), (4) Date: Jun. 2, 2004

(87) PCT Pub. No.: WO03/013889
PCT Pub. Date: Feb. 20, 2003

(65) Prior Publication Data
US 2004/0212213 A1 Oct. 28, 2004

(30) Foreign Application Priority Data
Aug. 1, 2001 (FR) .............................. 01 10348

(51) Int. Cl.$^7$ ................ B06J 7/20; B06J 7/14
(52) U.S. Cl. .................. 296/107.17; 296/108
(58) Field of Search .......... 296/107.01, 108, 296/107.16, 107.17, 107.08

(56) References Cited

U.S. PATENT DOCUMENTS 5,584,522 A    12/1996  Kerner et al.
5,647,630 A *  7/1997  Jambor et al. ............ 296/108
6,505,881 B2 * 1/2003  Kinnanen ............ 296/107.17
6,540,280 B2 * 4/2003  Tamura et al. ............ 296/108
6,702,363 B2 * 3/2004  Tohda et al. .............. 296/124
2003/0057727 A1 * 3/2003  Tohda et al. .......... 296/107.01
2003/0160475 A1 * 8/2003  Tohda et al. .............. 296/124
2003/0218355 A1 * 11/2003 Stenvers et al. ........... 296/108
2004/0007896 A1 * 1/2004  Reihl ........................ 296/108

FOREIGN PATENT DOCUMENTS

DE    197 12 967 A    10/1998
DE    198 34 850 A    2/2000
EP    1 092 580 A    4/2001

OTHER PUBLICATIONS

International Search Report for PCT/FR02/02766; ISA/EPO; Mailed Dec. 12, 2002.

* cited by examiner

*Primary Examiner*—Patricia Engle
(74) *Attorney, Agent, or Firm*—Harness Dickey & Pierce, P.L.C.

(57) ABSTRACT

The vehicle (2) has a partition wall (26) with a generally C-shaped longitudinal section that is situated in front of a volume (V3) swept by the rear roof portion (4). The wall (26) extends from the front bottom zone (13) of the trunk (16), firstly rearwards, then upwards, and then at least in part forwards so as to bear against the top stiffening beam (50). The partition wall (26) extends between two side walls (27) to which it is fixed so as to form a receptacle (51) defining a useful central first volume (V1a) that is accessible from inside the passenger space (25).

11 Claims, 5 Drawing Sheets

US 6,866,323 B2

CONVERTIBLE VEHICLE WITH A RETRACTABLE ROOF

The present invention relates to a convertible vehicle including a rigid retractable roof which can be placed in a retracted position inside the trunk at the rear of the vehicle.

A convertible vehicle is known with a rigid retractable roof comprising at least a front roof portion and a rear roof portion, the rear roof portion being pivotally mounted about a transverse pivot axis on the bodywork of the vehicle, the front roof portion being pivotally mounted on either side of the vehicle to one end of each of two respective lever arms hinged at their other ends to the bodywork of the vehicle, and being hinged at its rear end to the front end of the rear roof portion such that when the roof is in its retracted position in the rear trunk of the vehicle, the front roof portion is in a substantially horizontal position above the rear roof portion, the vehicle including in the front top portion of the rear trunk a top transverse stiffening beam for stiffening the bodywork.

Such a vehicle is disclosed in particular in DE-A-19 834 850.

When such a retractable roof is in its retracted position in the rear trunk of the vehicle, the rear roof portion has its concave side facing upwards, while the front roof portion has its concave side facing downwards, so that these two roof portions together occupy a large volume inside the rear trunk, leaving only a very limited volume available for baggage.

The object of the present invention is to remedy the above drawbacks of such a vehicle with a rigid retractable roof, and to propose a vehicle with a rigid retractable roof of the above-specified type in which the roof, when in the retracted position, occupies only a small volume at the rear of the vehicle so as to leave as large a volume as possible available for vehicle users, in such a manner as to make it possible, for example, to provide a volume that is accessible from inside the vehicle.

According to the present invention, the rigid retractable roof vehicle of the above-specified type is characterized in that the length in the longitudinal direction of the rear roof portion is considerably greater than the length of the front roof portion, and the transverse pivot axis of the rear roof portion is disposed so that when in the retracted position in the rear trunk of the vehicle, the rear roof portion occupies an inclined position going from the front bottom zone situated at the bottom of the rear trunk at the front of said trunk and extending substantially rearwards and upwards, said rear roof portion sweeping, during pivoting, through a volume situated between a front first curved surface and a rear second curved surface defining respectively, in the passenger space and in the rear trunk a first volume that is in front and centrally positioned and that is accessible from inside the vehicle, and a second volume that is behind and that can be accessed from outside via the rear of the vehicle, and in that the vehicle includes a partition wall having a generally C-shaped longitudinal section, said wall being situated in front of said front first curved surface and extending from said front bottom zone firstly rearwards, then upwards, and then at least in part forwards so as to bear against said top stiffening beam, the partition wall extending between two side walls to which it is fixed in order to form a receptacle defining respectively downwards and rearwards and also sideways a useful central first volume forming part of said central first volume.

The receptacle defines a useful first volume that is central and completely isolated from the roof in the retracted position, and also spaces through which the rear roof portion travels during the movements of the rear roof portion between its deployed position over the vehicle passenger space and its retracted position inside the rear trunk.

This useful first volume in the center can thus contain delicate objects such as clothes and small items of baggage, and can easily be accessible from the passenger space, either from above or from the front by folding down the back of at least one seat whose rear wall forms said receptacle.

Maximum advantage is thus taken of the concave shape of the rear roof portion in a transverse plane in order to arrange a first volume that is in front and central, and of the shape and the concave side of said rear roof portion in a longitudinal plane in order to limit as much as possible the volume of the space that exists between the first and second curved surfaces.

Other features and advantages of the present invention appear in the following detailed description of a rigid retractable roof comprising two portions.

In the accompanying drawings given purely as non-limiting examples:

Figure 1:
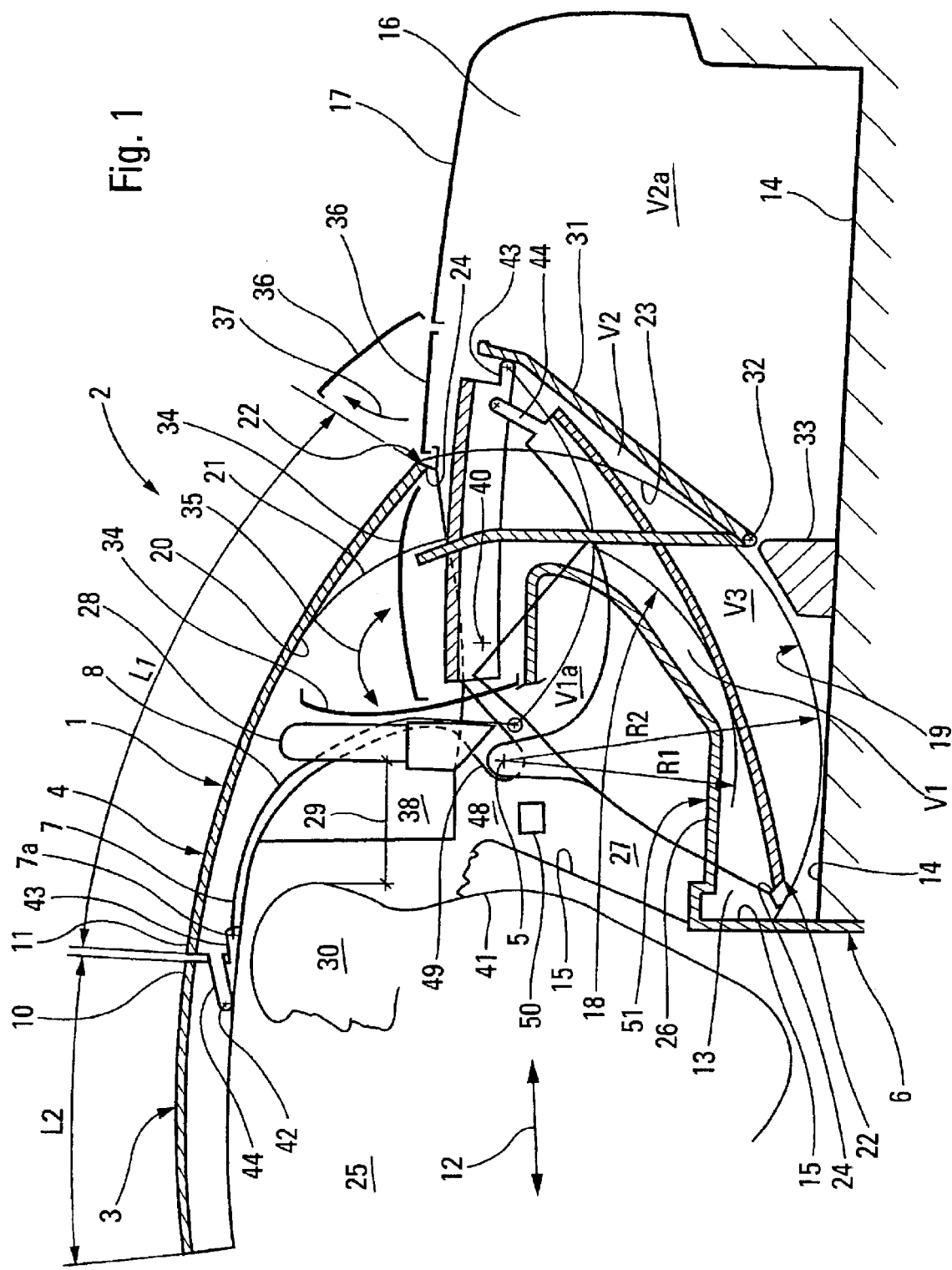
FIG. 1 is a diagrammatic longitudinal section view showing a fragment of a vehicle constituting an embodiment of the present invention, the retractable roof being shown both in its deployed position over the vehicle passenger space and in its retracted position at the rear of the vehicle.
Figure 2:
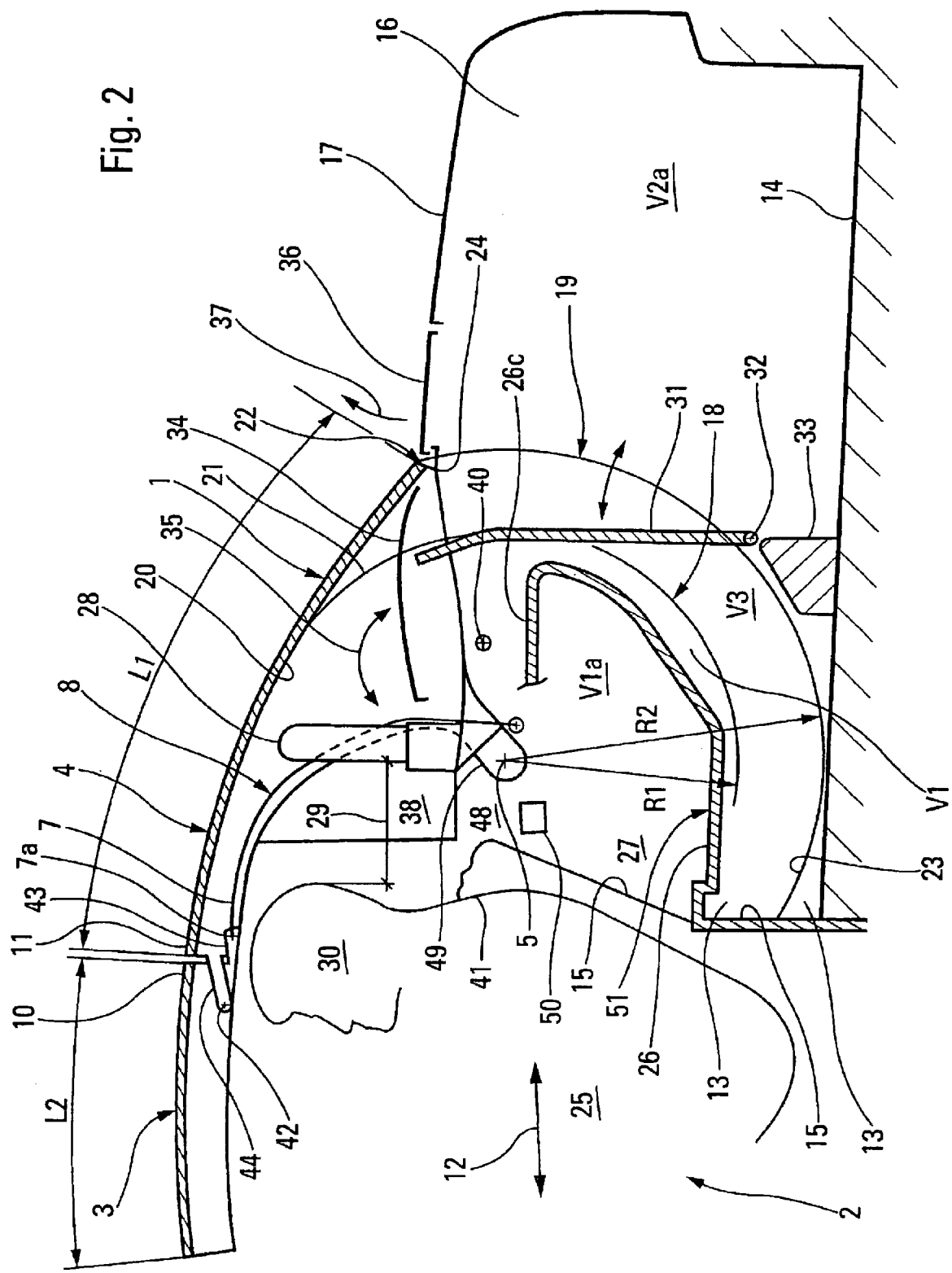
FIG. 2 is a view similar to FIG. 1 showing the retractable roof in its deployed position over the passenger space.
Figure 3:
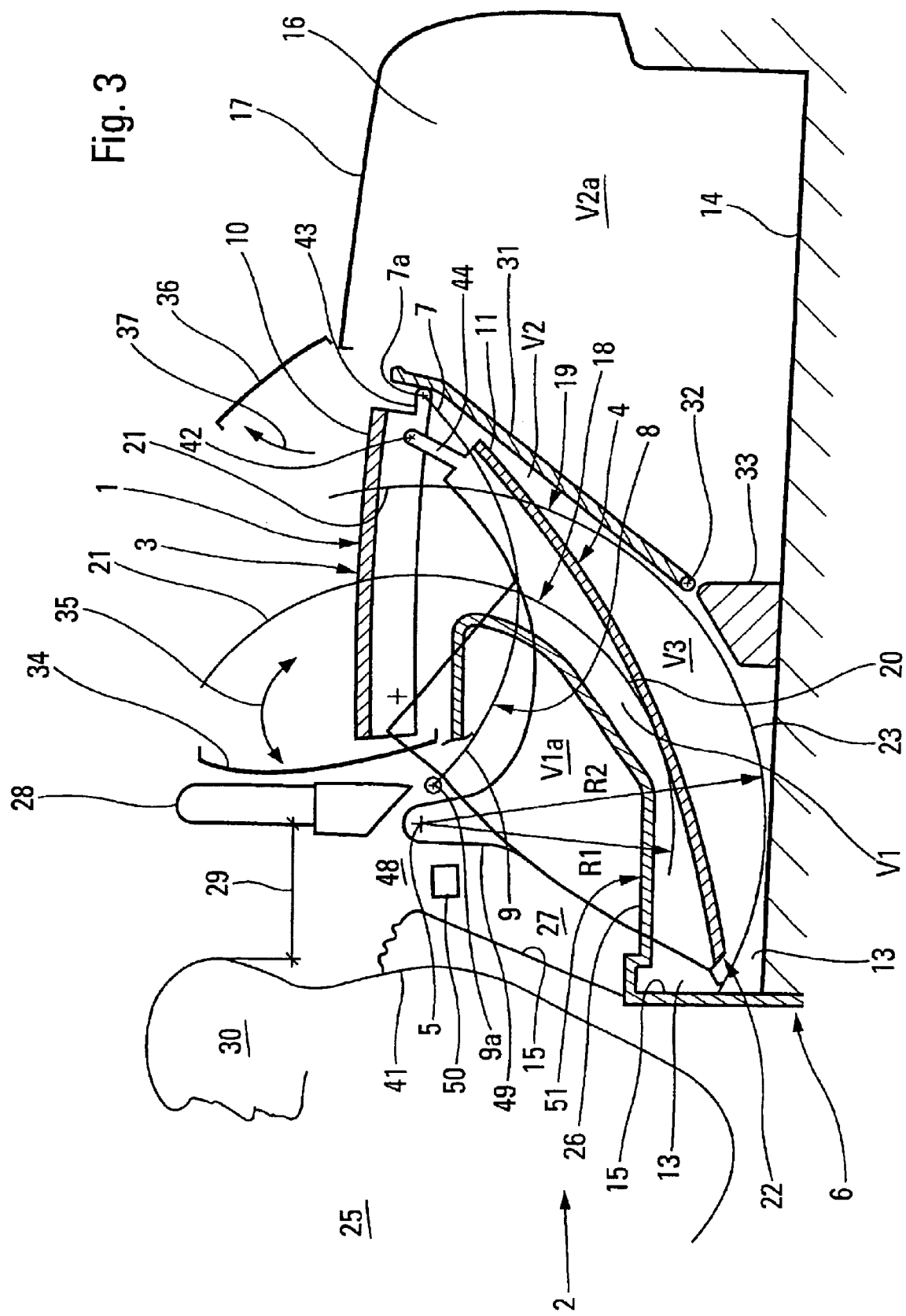
FIG. 3 is a view similar to FIG. 1 showing the retractable roof in its retracted position in the rear trunk of the vehicle.

In the embodiment shown in FIGS. 1 to 3, the rigid retractable roof 1 for a convertible vehicle 2 comprises a front roof portion 3 and a rear roof portion 4. The rear roof portion 4 is pivotally mounted on the bodywork 6 of the vehicle at two transversely opposite points situated on a common transverse pivot axis 5. The front roof portion 3 is pivotally mounted on each side of the vehicle at respective hinge points 7a situated at the first ends 7 of respective lever arms 8 hinged at their other ends 9 at hinge points 9a to the bodywork 6 of the vehicle 2.

The rear end 10 of the front roof portion 3 is hinged to the front end 11 of the rear roof portion 4.

Thus, the two lever arms 8 and the rear roof portion 4 which are hinged to the bodywork 6 of the vehicle co-operate therewith and with the front roof portion 3 to constitute a deformable quadrilateral which holds the front roof portion 3 substantially horizontal during pivoting of the roof 1 in either direction, with the concave side thereof continuing to face downwards.

Thus, when the roof 1 is in its retracted position in the rear trunk 16 of the vehicle 2, the front roof portion 3 is in a substantially horizontal position above the rear roof portion 4.

In this retracted position, and as mentioned above, the concave side of the rear roof portion 4 faces upwards while the concave side of the front roof portion 3 faces downwards.

In the front top zone 48 of the rear trunk 16, the vehicle 2 further comprises a top transverse stiffening beam shown diagrammatically at 50 for stiffening the bodywork 6 of the vehicle 2 in said zone 48. The top transverse beam 50 is of any appropriate shape and structure.

Thus, when the rigid retractable roof of the present invention is in the retracted position, the rear roof portion 4 occupies a predetermined inclined position in the rear trunk 16 of the vehicle, making maximum use of the height available between the bottom 14 and the cover 17 of the trunk 16 while also being as far forward as possible up to the above-mentioned zone 13 at the bottom at the front of said rear trunk 16.

In the present invention, the length L1 of the rear roof portion 4 in the longitudinal direction of the vehicle 2 as represented by arrow 12 is considerably greater than the length L2 of the front roof portion 3. These lengths L1 and L2 may be curved lengths, as shown in FIG. 1. Naturally, they could be rectilinear lengths obtained by projecting the above-mentioned curved lengths onto an axis parallel to the longitudinal direction 12 of the vehicle.

In addition, the transverse pivot axis 5 of the rear roof portion 4 is disposed on the bodywork 6 of the vehicle in a predetermined manner as a function of the length L1 of the rear roof portion 4 and as a function of the position of the seat back 41 whose rear surface 15 constitutes the front wall 15 which defines the forward end of the space available in the rear trunk 16 of the vehicle.

These two characteristics are defined in such a manner that when the rear roof portion 4 is in its retracted position in the rear trunk 16 of the vehicle 2, it occupies an inclined position starting from the front bottom zone 13 at the bottom 14 and at the front of said trunk 16, and extending substantially rearwards and upwards.

In this way, it can be seen that while it is pivoting, the rear roof portion 4 sweeps through a volume V3 lying between a front first curved surface 18 and a rear second curved surface 19 which define, respectively in the passenger space and in the rear trunk, in front of the front surface 18: a first volume V1 that is in front and centrally positioned, suitable for being accessed from inside the vehicle; and behind the rear surface 19, a second volume V2 that is behind and suitable for being accessed from outside via the rear of the vehicle.

In the example shown, the front first curved surface 18 is the surface obtained by taking a cross-section of the rear roof portion 4 at the point 20 of said rear roof portion that is situated closest to the transverse pivot axis 5 of said rear roof portion 4.

The front first curved surface 18 intersects the vertical longitudinal plane of symmetry of the vehicle (i.e. the plane of FIGS. 1 to 4) in a circle 21 of radius R1 swept by the point 20 during pivoting of the rear roof portion 4 in either direction about the axis 5.

Like the rear roof portion 4, the front first curved surface 18 has a central portion generated by the substantially flat central portion of the rear roof portion 4, together with two side portions generated by the side portions of relatively small radius of said rear roof portion 4, and also by the rear quarters or side uprights 49 which pivot about the transverse axis 5.

The rear second curved surface 19 is generated by the rear edge 22 of the rear roof portion 4 and intersects the vertical longitudinal plane of symmetry (i.e. the planes of FIGS. 1 to 4) in a circle 23 of radius R2 generated by the midpoint 24 of said rear edge 22.

The volume V3 swept by the rear roof portion 4 during pivoting in either direction and extending between the surfaces 18 and 19 depends on the shape and the orientation of the rear roof portion 4.

Figure 7:
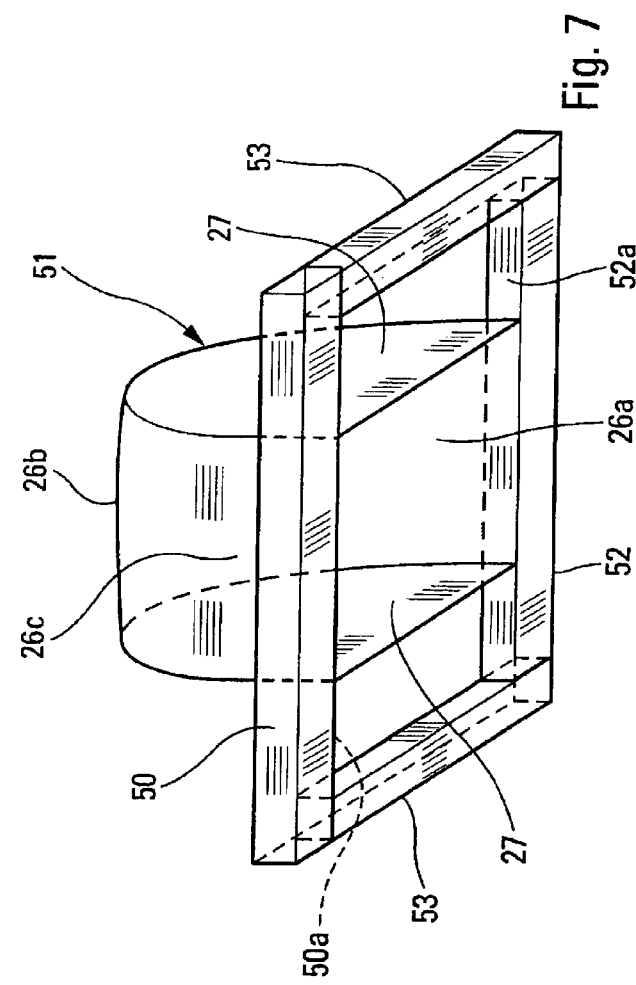
FIG. 7 is a diagrammatic perspective view from in front and above showing the device shown diagrammatically in FIG. 5.
Figure 6:
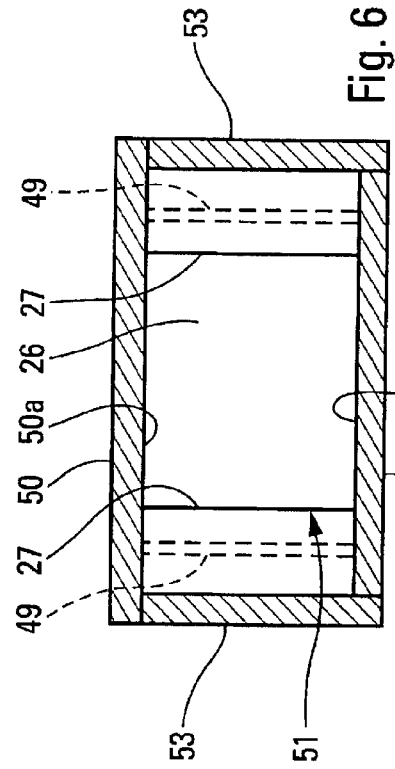
FIG. 6 is a diagrammatic view on VI—VI of FIG. 5.

Because of the shape of the surface 18, the central first volume V1 can extend transversely over a large fraction of the width of the vehicle passenger space 25, with the exception of the zones close to the side walls of said passenger space (see FIGS. 6 and 7).

It is thus possible to provide a partition wall 26 and two side walls 27 defining a central first volume V1$a$ that is usable as stowage space and that is accessible from inside the passenger space, while being isolated from the volume V3 that is swept by the rear roof portion 4 while it is pivoting, this volume V1$a$ forming part of the central first volume V1.

The top end of the partition wall 26 is extended at least in part in a forward direction by an additional substantially-horizontal wall portion referenced 26$c$ that is adapted to isolating the useful volume V1$a$ from the rear of the vehicle and for bearing against the top transverse stiffening beam 50.

Because of the difference between the above-mentioned lengths L1 and L2, the front roof portion 3 in its folded position covers only a rear fraction of the useful central volume V1$a$, with the front thereof remaining free for easy access and additional fittings.

In the embodiment of FIGS. 4 to 7, the vehicle 2 has a partition wall 26 whose longitudinal section is generally C-shaped, being situated in front of said front first curved surface 18 and extending from said front bottom zone 13 firstly rearwards and then upwards, and then at least in part forwards until it bears against said top front stiffening beam 50, following three successive segments constituting respectively a bottom segment 26$a$, a rear segment 26$b$, and a top segment 26$c$, the wall 26 being open towards the front.

The partition wall 26 extends between two side walls 27 to which it is fixed in order to form a receptacle 51 accessible from inside the passenger space 25 and defining respectively downwards and rearwards or sideways the useful central first volume V1$a$ forming part of said central first volume V1.

As shown diagrammatically in FIGS. 6 and 7, the top front stiffening beam 50, which is of any suitable shape and structure, co-operates with any appropriate structural means of the bodywork 6 constituting respectively a front bottom transverse stiffening beam shown diagrammatically at 52 and two stiffening side uprights shown diagrammatically at 53 so as to form an assembly in the shape of a quadrilateral 57 for stiffening the bodywork 6.

The walls 26 and 27 of the receptacle 51 are secured respectively to the top beam 50 and to the bottom beam 52 and contribute to communicating stiffness and an ability to withstand deformation and twisting to the quadrilateral 57 and to the bodywork 6 of the vehicle, which characteristics are highly desirable in convertible vehicles.

Figure 5:
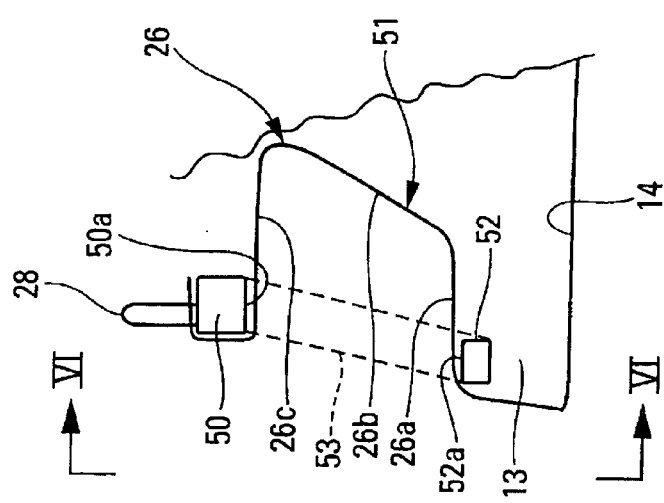
FIG. 5 is a fragmentary diagrammatic view of a detail of FIG. 4 in a variant embodiment of the present invention.

To this end, and as shown in FIGS. 5 to 7, the partition wall 26 is fixed in any suitable manner at least to the bottom face 50$a$ of the top beam 50 and at least to the top face 52$a$ of the bottom beam 52.

Figure 4:
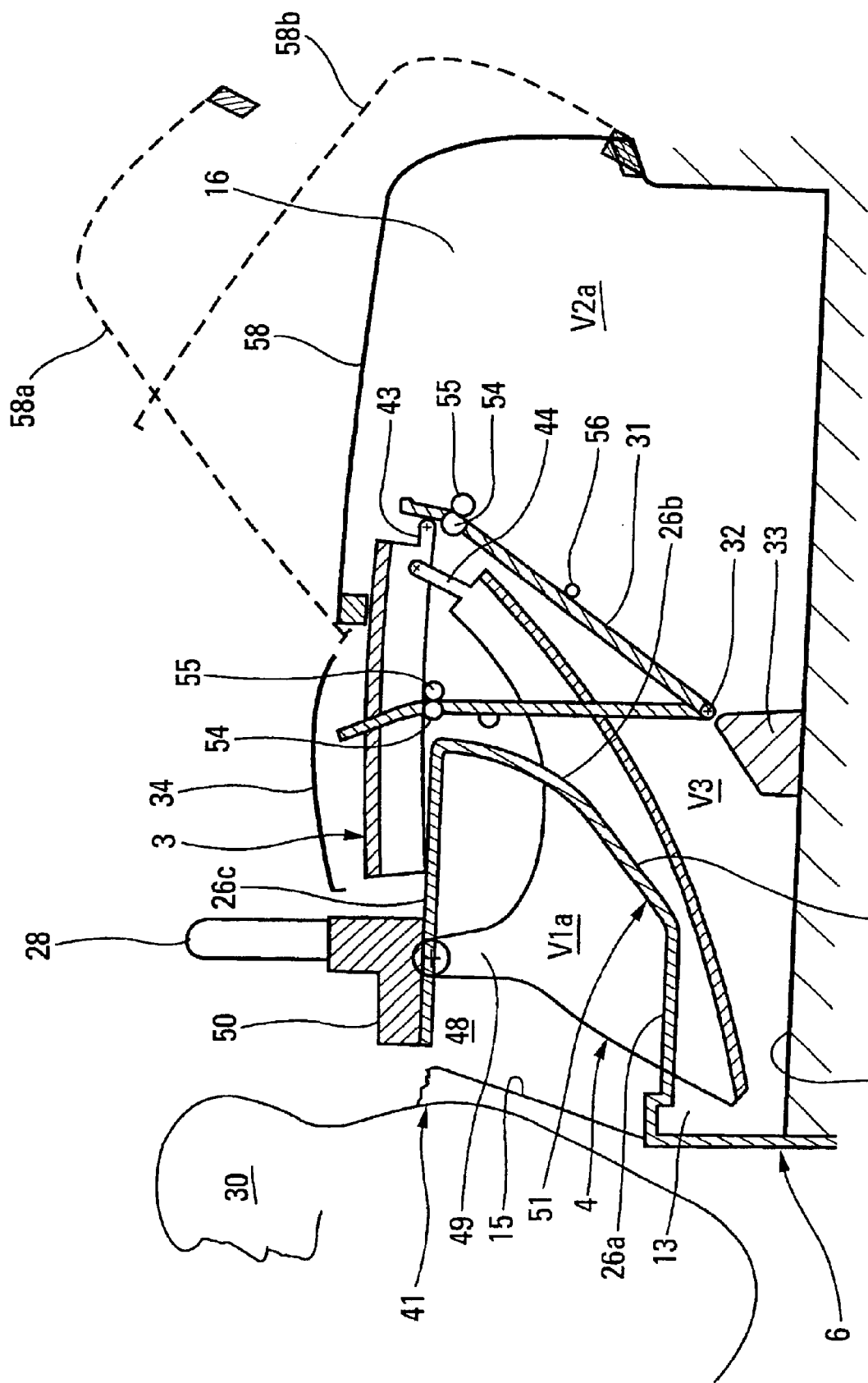
FIG. 4 is a fragmentary diagrammatic view similar to FIG. 1 showing a vehicle constituting another embodiment of the present invention.

As shown in the figures, rollbar-forming means 28 are placed immediately in front of the location occupied by the front roof portion 3 when it is in its retracted position inside the rear trunk 16 of the vehicle, said rollbar-forming means being fixed to the top transverse stiffening beam 50 (see FIGS. 1, 3, and 4).

These rollbar-forming means are any conventional means and they may be constituted, for example, either by a single arch or by two arches situated respectively behind each of the passenger seats, these arches being either fixed or deformable.

There thus remains a space referenced 29 between the rollbar-forming means 28 and the head, referenced 30, of a passenger, giving access from inside the passenger space 25 to the central first volume V1a inside the receptacle 51.

It is also possible to access the inside of the receptacle 51 from the front, for example by folding down forwards the back 41 of at least one of the seats in front of the rear trunk 16.

In the example shown in FIGS. 1 to 4, the vehicle 2 has a transverse panel referenced 31 defining the front of a second useful volume V2a at the rear that is available for receiving baggage in the rear trunk 16 and that forms part of the second volume V2.

The transverse panel 31 is preferably movable between a forward first position shown in FIGS. 1 and 2 when the retractable roof 1 is in its deployed position over the passenger space 25, and a rearward second position shown diagrammatically in FIGS. 1, 3, and 4 when the roof 1 is in its position retracted in the rear trunk 16.

In this example, the transverse panel 31 is pivotally mounted about a second transverse pivot axis 32 situated close to the bottom 14 of the rear trunk 16, for example on a transverse support 33 fixed on the bottom 14 behind the rear second curved surface 19.

In the example shown, the panel 31 in its front position is close to the vertical and substantially tangential to the rear of the wall 26, while in its rear position it is inclined in a position that is as close as possible to the front and rear roof portions 3 and 4 in their retracted position.

In the embodiment of FIG. 4, the vehicle 2 has additional locking means referenced 54 and 55 carried respectively by the panel 31 and by the bodywork 6 in order to lock the transverse panel 31 to the bodywork 6 of the vehicle and prevent it while in its first position from moving forwards, and while in its second position from moving rearwards.

These locking means 54 and 55 are any conventional means, for example they may be constituted by moving latches 54 or 55 adapted to co-operate with corresponding catches 55 or 54.

In the same embodiment, the vehicle 2 has sensors referenced 56 that are adapted to detect the presence of the transverse panel 31 in its first position or in its second position.

Such sensors 56 of any known type are integrated in a logic circuit for controlling successive movements of the cover 17, the shelf panel 34, the panel 31, and the roof elements 3 and 4 so as to confirm or inhibit an instruction to move the roof elements 3 and 4 in one direction or the other depending on whether the various moving members are properly positioned or not.

It can be seen in the figures that the vehicle 2 has a shelf panel 34 that is movable between a substantially horizontal normal position as shown in FIGS. 1 and 2 and a substantially vertical raised position as shown in FIGS. 1 and 3, thus enabling the retractable roof 1 to pivot in one direction or the other, as represented by arrow 35.

By way of example, the shelf panel 34 may be mounted to pivot about lateral pivot points situated on a common third transverse pivot axis 40.

In a variant, the shelf panel 34 may be mounted to pivot on two pivot arms disposed on either side of the vehicle (not shown).

In order to enable the front and rear roof portions 3 and 4 to pivot, the system 1 further comprises, in front of the cover 17 of the rear trunk 16, a transverse flap 36 adapted to pivot from the front rearwards as represented by arrow 37 in order to allow the front end 11 of the rear roof portion 4 and the rear end 10 of the front roof portion 3 to go past. The flap is then reclosed.

In the embodiment of FIG. 4, the cover 58 of the rear trunk is a single piece, and the vehicle has means for opening the cover 58 from the rear towards the front into a position 58a for loading baggage, or from the front towards the rear into a position 58b to allow the roof 1 to be retracted into the rear trunk 16.

These means can be those described in FR-B-2 77 241, for example.

In the example shown in FIGS. 1 to 3, the rear roof portion 4 carries fixed rear quarter windows 38 on either side of the vehicle suitable for pivoting together with said rear roof portion 4.

Such a window (glaze) 38 thus serves to increase the lateral glazed surface area of the vehicle without the drawback that is encountered in prior art retractable roofs in which such windows need to be vertically movable and to be lowered prior to pivoting the retractable roof towards its retracted position, and then raised after the retractable roof has been pivoted into its deployed position.

In the example shown in the figures, the hinge point 9a of each lever arm 8 on the bodywork 6 of the vehicle 2 is situated behind the transverse pivot axis 5 of the rear roof portion 4. In addition, the hinge point 7a of each lever arm 8 on the rear end 10 of the front roof portion 3 is situated, when the roof system 1 is in its deployed position, behind hinge points 42 between the front roof portion 3 and the front end 11 of the rear roof portion 4.

For this purpose, the hinge point 7a of each lever 8 is carried by a first corresponding tab 43 extending rearwards from the rear end 10 of the front roof portion 3.

In addition, each hinge point 42 is carried by a second corresponding tab 44 extending forwards from the front end 11 of the rear roof portion 4.

Naturally, the present invention is not limited to the embodiments described above, and numerous changes and modifications can be made thereto without going beyond the invention.

What is claimed is:

1. A convertible vehicle (2) with a rigid retractable roof (1), the vehicle (2) including a front roof portion (3) and a rear roof portion (4), the rear roof portion (4) being pivotally mounted on the bodywork (6) of the vehicle (2) about a transverse pivot axis (5), the front roof portion (3) being pivotally mounted on either side of the vehicle (2) to one end (7) of each of two respective lever arms (8) hinged at their other ends (9) to the bodywork (6) of the vehicle, and being hinged at its rear end (10) to the front end (11) of the rear roof portion (4) in such a manner that when the roof system (1) is in its retracted position in the rear trunk (16) of the vehicle (2), the front roof portion (3) occupies a substantially horizontal position over the rear roof portion (4), the vehicle including in the front top portion of the rear trunk (16) a top transverse stiffening beam (50), the vehicle being characterized in that the length (L1) in the longitudinal direction (12) of the rear roof portion (4) is greater than the length (L2) of the front roof portion (3), and the transverse pivot axis (5) of the rear roof portion (4) is disposed so that when in the retracted position in the rear trunk (16) of the vehicle (2), the rear roof portion (4) occupies an inclined position going from the front bottom zone (13) situated at the bottom (14) of the rear trunk (16) at the front of said trunk and extending substantially rearwards and upwards, said rear roof portion (4) sweeping, during pivoting, through a volume (V3) situated between a front first curved surface (18) and a rear second curved surface (19) defining, respectively in the passenger space (25) and in the rear trunk (16), a first volume (V1) that is in front and centrally positioned and that is accessible from inside the vehicle (2), and a second volume (V2) that is behind and that can be accessed from outside via the rear of the vehicle (2), and in that the vehicle includes a partition wall (26) having a generally C-shaped longitudinal section, said wall being situated in front of said front first curved surface (18) and extending from said front bottom zone (13) firstly rearwards, then upwards, and then at least in part forwards so as to bear against said top stiffening beam (50), the partition wall (26) extending between two side walls (27) to which it is fixed in order to form a receptacle (51) defining respectively downwards and rearwards and also sideways a useful central first volume (V1a) forming part of said central first volume (V1).

2. A vehicle with a rigid retractable roof according to claim 1, the vehicle being characterized in that rollbar-forming means (28) are placed immediately in front of the location occupied by the front roof portion (3) in its retracted position in the rear trunk (16) of the vehicle, and are fixed to said top stiffening beam (50).

3. A vehicle with a rigid retractable roof according to claim 1, the vehicle being characterized in that it includes a transverse panel (31) defining the front of a useful rear second volume (V2a) available for receiving baggage in the rear trunk (16) and forming part of said second rear volume (V2), said transverse panel (31) preferably being movable between a forward first position when the retractable roof (1) is in its position deployed over the passenger space (25), and a rearward second position when the roof (1) is in its retracted position in the rear trunk (16) of the vehicle (2).

4. A vehicle with a rigid retractable roof according to claim 3, the vehicle being characterized in that the transverse panel (31) is pivotally mounted about a transverse pivot axis (32) situated close to the bottom (14) of the rear trunk (16).

5. A vehicle with a rigid retractable roof according to claim 4, the vehicle being characterized in that it includes locking means (54, 55) for locking the transverse panel (31) to the vehicle bodywork in the forward first position and in the rearward second position of said panel (31).

6. A vehicle with a rigid retractable roof according to claim 3, the vehicle being characterized in that it includes sensors (56) adapted to detect the presence of the transverse panel (31) in its first position and in its second position.

7. A vehicle with a rigid retractable roof according to claim 1, the vehicle being characterized in that the rear roof portion (4) carries on either side a fixed rear quarter window (38).

8. A vehicle with a rigid retractable roof according to claim 1, the vehicle being characterized in that it includes a shelf panel (34) movable between a substantially horizontal normal position and a substantially vertical raised position enabling the retractable roof (1) to pivot in either direction.

9. A vehicle with a rigid retractable roof according to claim 1, the vehicle being characterized in that the hinge point (9a) of each lever arm (8) on the bodywork (6) of the vehicle (2) is situated behind the transverse pivot axis (5) of the rear roof portion (4), and in that the hinge point (7a) of each lever arm (8) on the rear end (10) of the front roof portion (3) is situated, in the deployed position of the roof (1), behind the hinge points (42) between the front roof portion (3) and the front end (11) of the rear roof portion (4).

10. A vehicle with a rigid retractable roof according to claim 1, the vehicle being characterized in that it includes, in front of the cover (17) of the rear trunk (16), a transverse flap (36) adapted to pivot from the front towards the rear to enable the rigid retractable roof (1) to pivot in either direction.

11. A vehicle with a rigid retractable roof according to claim 1, the vehicle being characterized in that the cover (58) of the rear trunk (16) is a single piece, and in that the vehicle (2) includes means for opening said cover (58) from the rear towards the front in order to load baggage, or from the front towards the rear in order to allow the retracted roof to pass into the rear trunk (16).

* * * * *

UNITED STATES PATENT AND TRADEMARK OFFICE
CERTIFICATE OF CORRECTION

PATENT NO. : 6,866,323 B2
DATED : March 15, 2005
INVENTOR(S) : Jean-Marc Guillez, Paul Queveau and Gerard Queveau It is certified that error appears in the above-identified patent and that said Letters Patent is hereby corrected as shown below:

<u>Title page,</u>
Item [73], Assignee, "Societe Europeene de Brevets" should be -- Societe Europeenne des Brevets Automobiles --

Signed and Sealed this

Twelfth Day of July, 2005

JON W. DUDAS
*Director of the United States Patent and Trademark Office*